United States Patent
McKown

(10) Patent No.: US 9,965,287 B1
(45) Date of Patent: May 8, 2018

(54) VIRTUALIZED MULTICORE SYSTEMS WITH EXTENDED INSTRUCTION HETEROGENEITY

(71) Applicant: Open Invention Network LLC, Durham, NC (US)

(72) Inventor: Russell C. McKown, Richardson, TX (US)

(73) Assignee: Open Invention Network LLC, Durham, NC (US)

( * ) Notice: Subject to any disclaimer, the term of this patent is extended or adjusted under 35 U.S.C. 154(b) by 1037 days.

(21) Appl. No.: 13/749,044

(22) Filed: Jan. 24, 2013

Related U.S. Application Data

(60) Provisional application No. 61/591,305, filed on Jan. 27, 2012, provisional application No. 61/591,311, filed on Jan. 27, 2012.

(51) Int. Cl.
| | | |
|---|---|---|
| *G06F 9/45* | (2006.01) | |
| *G06F 9/38* | (2018.01) | |
| G06F 9/30 | (2018.01) | |
| G06F 9/44 | (2018.01) | |
| G06T 1/20 | (2006.01) | |
| G06F 15/80 | (2006.01) | |

(52) U.S. Cl.
CPC ........ *G06F 9/3885* (2013.01); *G06F 9/30138* (2013.01); *G06F 9/30181* (2013.01); *G06F 9/4405* (2013.01); *G06F 15/80* (2013.01); *G06T 1/20* (2013.01)

(58) Field of Classification Search
CPC ............. G06F 9/30181; G06F 9/30138; G06F 9/4405; G06T 1/20
See application file for complete search history.

(56) References Cited

U.S. PATENT DOCUMENTS

| | | | | |
|---|---|---|---|---|
| 7,533,246 B2* | 5/2009 | Taylor | ..................... | G06F 8/447 712/200 |
| 2005/0216701 A1* | 9/2005 | Taylor | ..................... | G06F 8/447 712/34 |
| 2005/0223199 A1* | 10/2005 | Grochowski | ....... | G06F 9/30003 712/235 |
| 2006/0101432 A1* | 5/2006 | Simons | ................... | G06F 8/423 717/138 |
| 2007/0271547 A1* | 11/2007 | Gulko | ..................... | G06F 8/451 717/106 |
| 2008/0059769 A1* | 3/2008 | Rymarczyk | ......... | G06F 9/30181 712/209 |

(Continued)

OTHER PUBLICATIONS

Pan Y and Tulika Mitra, Characterizing Embedded Applications for Instruction-Set Extensible Processors, ACM, 2004, retrieved on Dec. 21, 2017, pp. 1-6. Retrieved from the Internet: <URL: https://www.comp.nus.edu.sg/~tulika/dac04.pdf>.*

*Primary Examiner* — Hanh T Bui
(74) *Attorney, Agent, or Firm* — Haynes and Boone, LLP

(57) ABSTRACT

A system on a chip may include a plurality of data plane processor cores sharing a common instruction set architecture. At least one of the data plane processor cores is specialized to perform a particular function via extensions to the otherwise common instruction set architecture. Such systems on a chip may have reduced physical complexity, cost, and time-to-market, and may provide improvements in core utilization and reductions in system power consumption.

10 Claims, 14 Drawing Sheets

(56) References Cited

U.S. PATENT DOCUMENTS

2009/0222654 A1\* 9/2009 Hum ................. G06F 13/24
 713/100
2011/0113410 A1\* 5/2011 Loen ................. G06F 8/456
 717/149

\* cited by examiner

Resource Requirements Table for Data User Component n

Memory Requirements: xxx Kbytes I-Memory, xxx Kbytes D-Memory, xxx Kbytes Shared Memory

| DPP Core Identification | Normalized Execution Time |
|---|---|
| 1 | 1.2 |
| 2 | 1.4 |
| 3 | 1 |
| 5 | 1.2 |
| 6 | 1.4 |
| 7 | 2.1 |
| 9 | 2.6 |
| 10 | Not Available |
| 11 | Not Available |

| Mode ID = X   DPP Component Profiles ||
|---|---|
| DPP Core ID | Data User Component ID |
| 1 | 1, 5 |
| 2 | 2, 6 |
| 3 | 3, 7 |
| 5 | OFF |
| 6 | OFF |
| 7 | OFF |
| 9 | 11 |
| 10 | OFF |
| 11 | 33, 35 |

FIG. 13

| DPP-X to DPP-Y B2B Translation Function Identification Table | |
|---|---|
| DPP-Y Identification | B2B Translation Function ID (DPP-X to DPP-Y) |
| 1 | 2-1, 3-1, 5-1, 6-1 |
| 2 | None Necessary |
| 3 | 6-3 |
| 4 | 2-1, 3-1, 5-1, 6-1 |
| 5 | 6-3 |
| 6 | None Necessary |

1300

VIRTUALIZED MULTICORE SYSTEMS WITH EXTENDED INSTRUCTION HETEROGENEITY

CROSS REFERENCE TO RELATED APPLICATIONS

This application claims priority of U.S. Provisional Patent Application Ser. No. 61/591,305, filed Jan. 27, 2012, and U.S. Provisional Patent Application Ser. No. 61/591,311, filed Jan. 27, 2012. The subject matter of these earlier-filed applications is hereby incorporated by reference in its entirety.

FIELD

The present invention generally relates to computer processing, and more particularly, to multicore systems where data plane processor cores may be made heterogeneous by means of extensions to an otherwise common instruction set architecture.

BACKGROUND

Two evolving computer technologies, the hardware technology of multicore processors and the software technology of computer virtualization, individually promise to lower the cost and improve the energy efficiency of computers. It may be beneficial to achieve the additional benefits that are available when proper advantage is taken of both technologies. Advances in engineering of "systems on a chip" (SoCs) coupled with advances in integrated circuit design and fabrication technologies have led to the development of "manycore processors" on a single chip, where "many" may be 5 to greater than 100, for example, depending on the application, size, and function of the individual cores.

The processors may be identical (homogeneous manycore processors) or different (heterogeneous manycore processors). Another classification is whether the processors perform specialized data processing (Data Plane Processors, or DPPs) or perform general purpose processing (Control Plane Processors, or CPPs). Typically DPPs become specialized because they either have closely attached special arithmetic units or loosely attached special computation accelerator units. In the present application, the traditional term "multicore" will be used instead of the newer term "manycore".

When application specific accelerators and/or custom processor cores such as DPPs are used, the resultant SoC may become highly specialized with respect to a given application. This may reduce the available market for the chip and may require redesigns for other applications. Such specialization may drive up development costs and increase the time-to-market of the SoC.

SUMMARY

Certain embodiments of the present invention may provide solutions to the problems and needs in the art that have not yet been fully identified, appreciated, or solved by current multicore technologies. For example, some embodiments of the present invention facilitate heterogeneous DPP cores by means of extensions to an otherwise common instruction set architecture (ISA).

In one embodiment, an apparatus includes a plurality of data plane processor cores sharing a common instruction set architecture. At least one of the data plane processor cores is specialized to perform a particular function via extensions to the otherwise common instruction set architecture.

In another embodiment, a computer-implemented method performed by a physical computing device includes determining equivalent instructions between a first data plane processing core and a second data plane processing core. The computer-implemented method also includes outputting a set of function calls to be executed by the second data plane processing core that produce computational results equivalent to specific code segments when executed by the first data plane processing core.

In yet another embodiment, a computer-implemented method performed by a physical computing device includes searching code for a synchronization marker. The computer-implemented method also includes, when a synchronization marker is found, determining whether the code segment contains extended instructions and if so, identifying and storing relevant code segments for a first data plane processing core and a second data plane processing core.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 6 illustrates a Resource Requirements Table for Data User Component n that identifies Memory Requirements and a Normalized Execution Time for executing the component on each of the DPP cores, according to an embodiment of the present invention.

FIG. 7 illustrates a Mode ID DPP Component Profile table, according to an embodiment of the present invention.

FIG. 13 is a bar graph illustrating an EI2EI Translation Function Identification Table, according to an embodiment of the present invention.

DETAILED DESCRIPTION OF THE EMBODIMENTS

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

It should also be noted that in this description, certain terms are used interchangeably. For instance, the terms "DPP" and "DPP core" are used interchangeably, as are the terms "CPP" and "CPP core". Further, the terms "processor" and "processor core" are used interchangeably.

Figure 1:
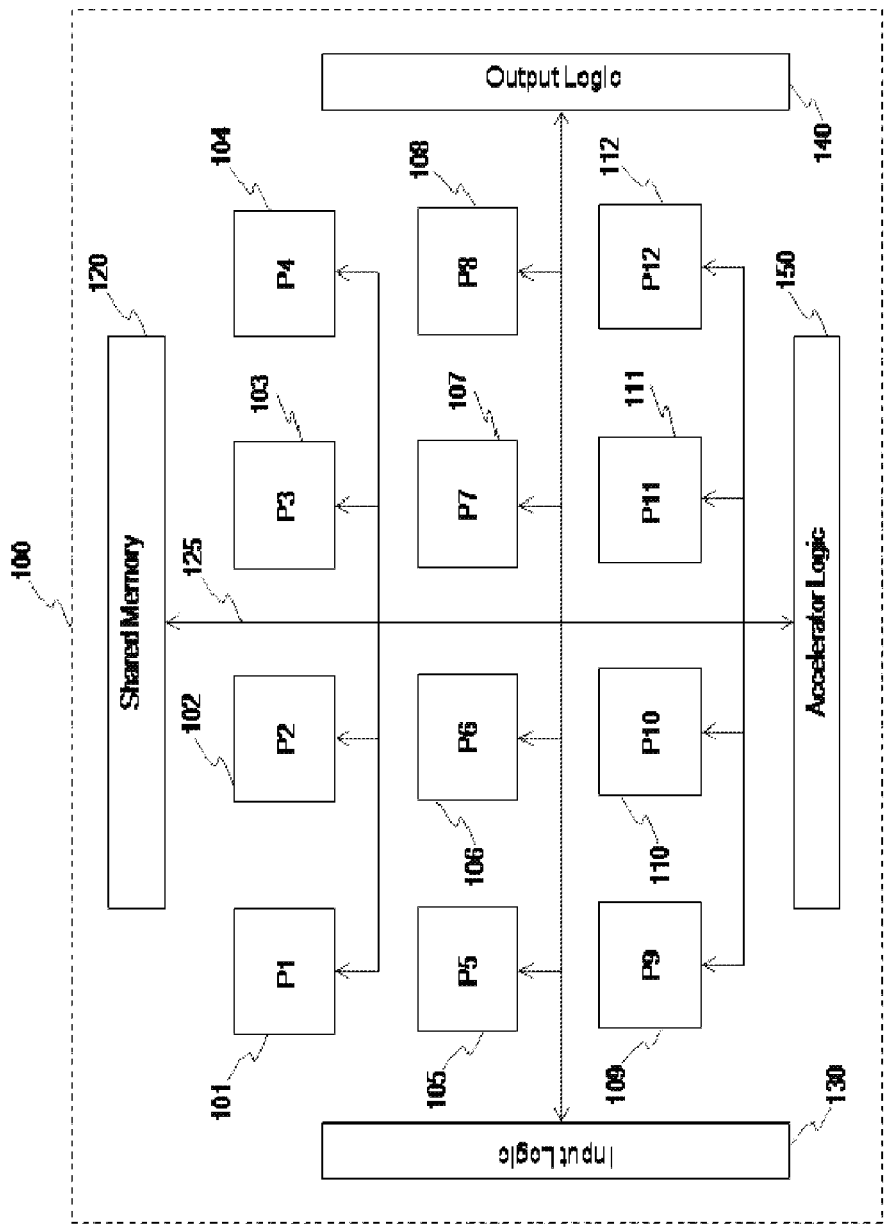
FIG. 1 illustrates an architectural diagram of a multicore SoC.

FIG. 1 illustrates an architectural diagram of a multicore SoC 100. Multicore SoC 100 includes processor cores 101-112, shared memory 120, input logic 130, output logic 140, and accelerator logic 150. Each processor core contains private memory (not shown). Intrachip component interconnects are functionally indicated by bidirectional arrows 125. Examples of intrachip interconnect techniques include bus, crossbar, ring, and network-on-chip (NoC). Also not shown in FIG. 1 is the use of shared memory 120 to provide high speed data paths between specific processors, such as first-in-first-out (FIFO) buffers.

Accelerator logic 150 is typically made up of application specific integrated circuits (ASICs) that function as integrated peripherals to perform power and area efficient specialized processing for one or more of processor cores 101-112. In general, processor cores 101-112 can be heterogeneous where they have different types of instruction sets and different (instruction set associated) hardware microarchitectures. The ISA code and hardware that defines a processor core can be designed for specific processing stages in an embedded system application.

As discussed above, when application specific accelerators and/or custom processor cores such as DPPs are used, as in FIG. 1, the resultant system on a chip may become highly specialized with respect to a given application. This may reduce the available market for the chip and may require redesigns for other applications. Further, such specialization may drive up development costs and increase the time-to-market.

Some embodiments of the present invention pertain to a virtualization architecture and extensions to support load balancing in heterogeneous multicore SoCs for embedded applications where both DPPs and CPPs are present. SoCs for embedded applications are employed where a single chip contains groups of DPP cores and groups of CPP cores. In particular, the virtualization architecture may be used to support load balancing of DPP cores that are physically homogeneous, but specialized by means of extensions to an otherwise common ISA in some embodiments. In certain embodiments, it may be assumed that the DPP cores are automatically synthesized using currently available high level design tools. The approach to load balancing of some embodiments may provide improvements in core utilization and reductions in system power consumption.

Figure 2:
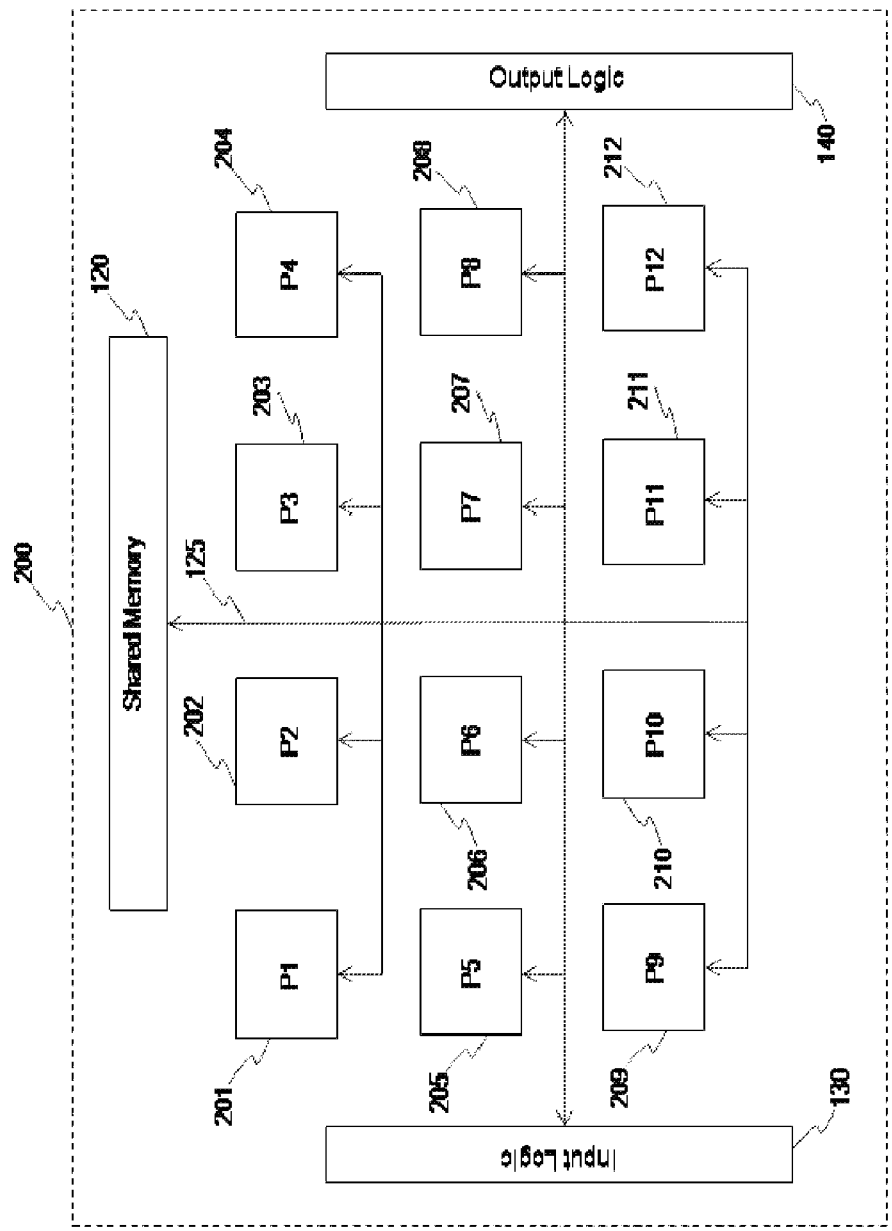
FIG. 2 illustrates an architectural diagram of a multicore SoC that does not contain peripheral application specific accelerators, according to an embodiment of the present invention.

FIG. 2 illustrates an architectural diagram of a multicore SoC 200 that does not contain peripheral application specific accelerators, according to an embodiment of the present invention. SoC 200 contains twelve processor cores 201-212. As is better illustrated in FIG. 3, some of the cores are DPP cores and come of the cores are CPP cores. In place of peripheral application specific accelerators such as accelerator logic 150 of FIG. 1, some of the DPP cores are designed to perform the special computations. All or a subset of the DPP cores may be additionally constrained to have elements that perform the special computations designed so that they are controlled by instructions that are extensions of an otherwise common instruction set. This enables a set of specialized processing cores to maintain a common base ISA.

Embodiments of the SoCs described herein may include common chip components, such as processor cores, buses for transporting information between components, memory, and communication devices that facilitate communication with outside systems. The memory may store information and instructions to be executed by the processor cores. The memory can be comprised of any combination of random access memory (RAM), read only memory (ROM), flash memory, cache, static storage such as a magnetic, optical disk, or solid state memory devices, or any other types of non-transitory computer-readable media or combinations thereof. Non-transitory computer-readable media may be any available media that can be accessed by the processor cores and may include both volatile and non-volatile media, removable and non-removable media, and communication media. Communication media may include computer-readable instructions, data structures, program modules, lookup tables, or other data in a modulated data signal such as a carrier wave or other transport mechanism and includes any information delivery media.

One skilled in the art will appreciate that an SoC could be included as part of a personal computer, a server, a console, a personal digital assistant (PDA), a cell phone, or any other suitable computing device, or combination of devices. Presenting the above-described functions as being performed by an SoC is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification may be performed by "modules". A module, for example, may be implemented as a hardware circuit comprising SoCs, custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors and/or processor cores. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
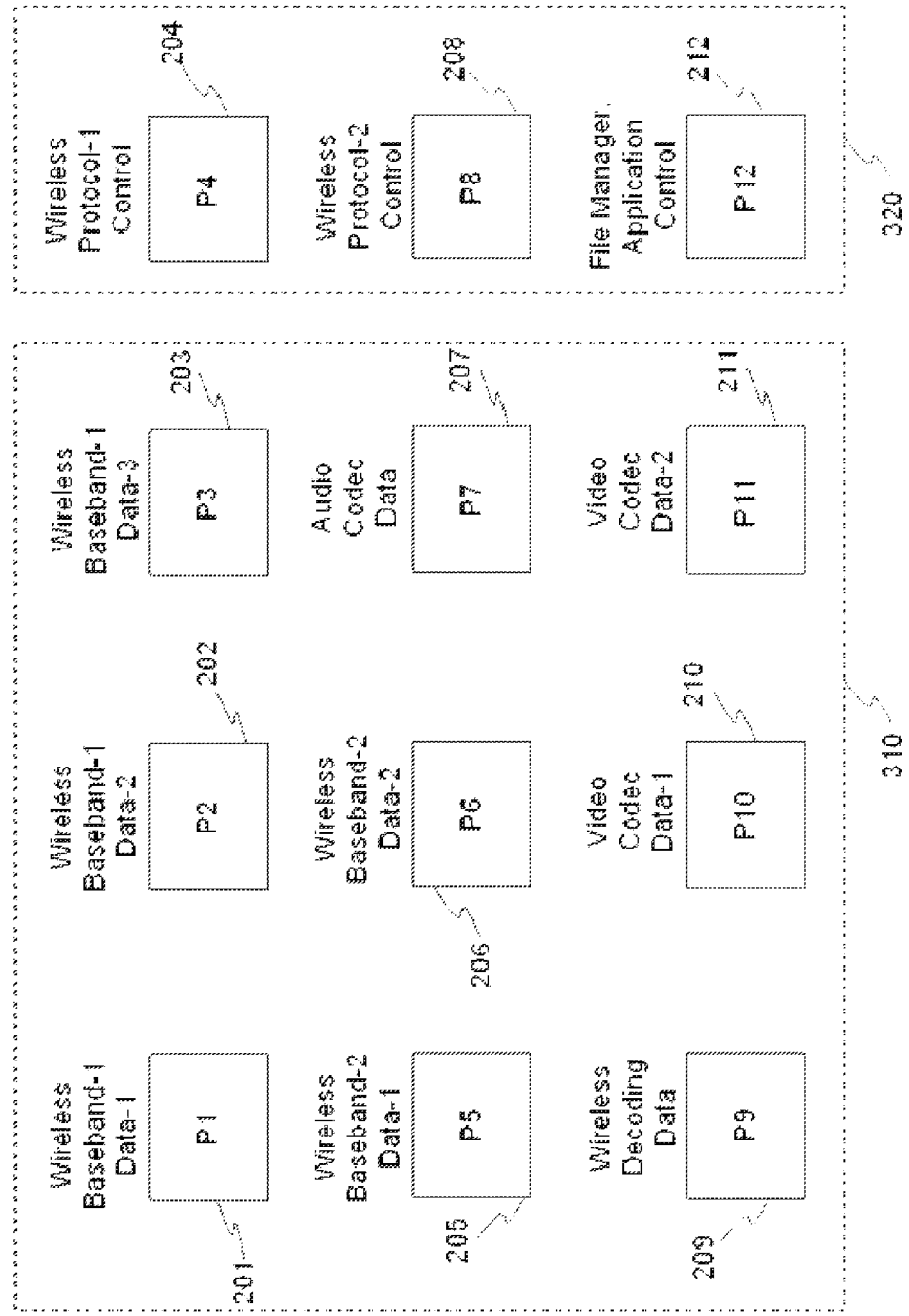
FIG. 3 illustrates an architectural view of an example heterogeneous multicore implementation of the multicore SoC, according to an embodiment of the present invention.

FIG. 3 illustrates an architectural view of an example heterogeneous multicore implementation of multicore SoC 200, according to an embodiment of the present invention. Multicore SoC 200 has a heterogeneous (but common) base ISA group of DPPs 310 and a homogeneous group of CPPs 320. In this embodiment, different data user tasks such as "Wireless Baseband-1 Data-1" execute on a DPP such as DPP core 201 and different control user tasks such as "Wireless Protocol-1 Control" execute on a CPP such as CPP core 204.

Figure 4:
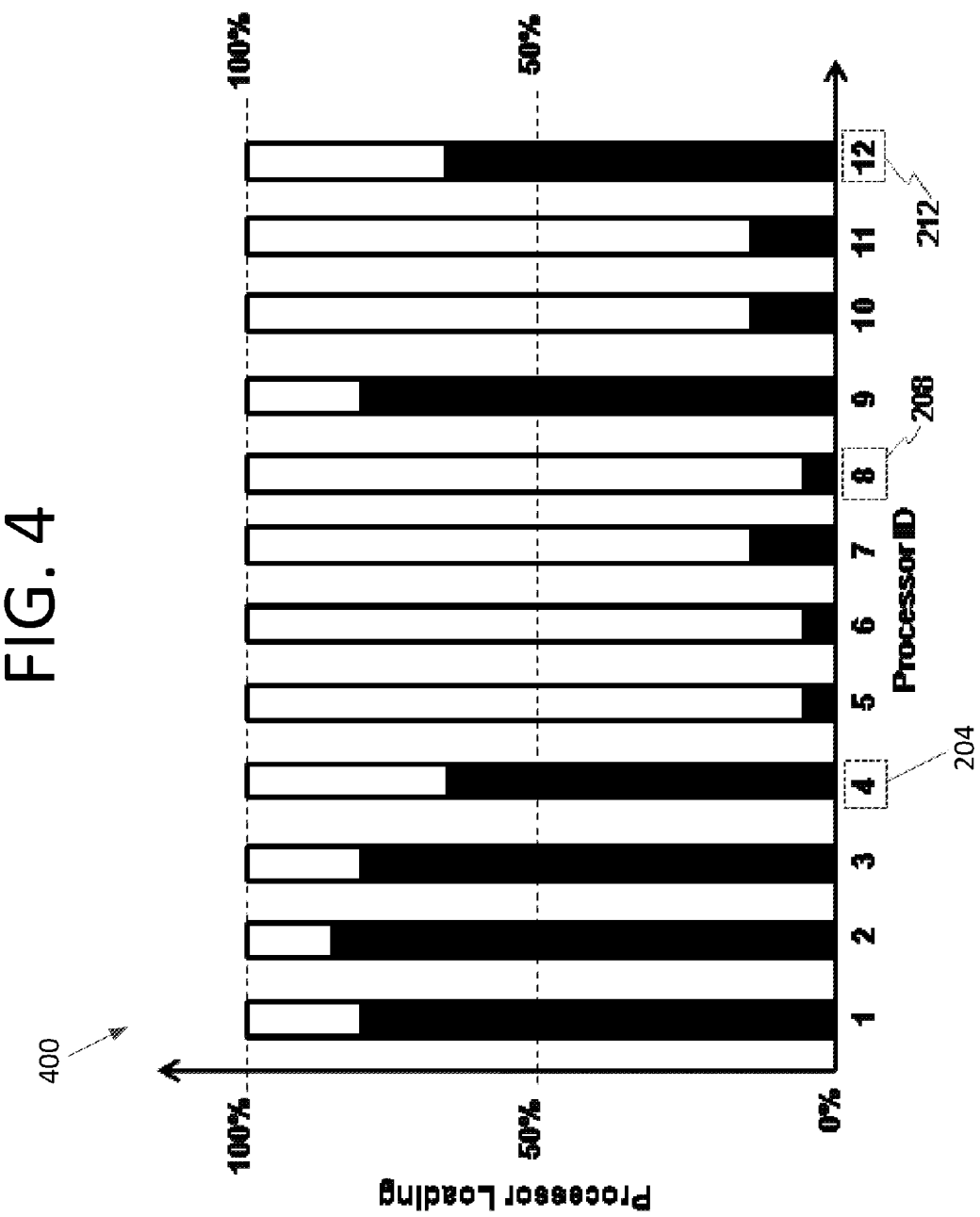
FIG. 4 is a bar graph illustrating a processing load distribution for the heterogeneous multicore system of FIGS. 2 and 3, according to an embodiment of the present invention.

FIG. 4 is a bar graph 400 illustrating a processing load distribution for the heterogeneous multicore system of FIGS. 2 and 3, according to an embodiment of the present invention. Here, the processing load distribution is under the conditions of an active wireless link on the baseband-1 wireless network, such as a file download from a 3G WCDMA cellular network connection, without video streaming activity at this time. The second baseband-2 wireless system, for example a WiFi wireless LAN connection, is inactive at this time. These conditions may result in a considerable processing load on the DPPs associated with the nearly continuously required data processing tasks for baseband-1, e.g., cores 201-204 and 209, together with the file storing activity on CPP core 212. DPP cores 205, 206, and 208 are associated with the inactive baseband-2 and are very lightly loaded, as are audio and video codec DPP cores 207, 210 and 211, since the current activity is a file download.

FIGS. 3 and 4 provide an example of a set of required data and control user tasks or applications that may be supported by a particular multicore SoC. The processing support requirements for the tasks or applications in the set are dynamic and have different levels or types of "real time" deadlines for execution. For example, the baseband data plane tasks may have deadlines imposed by a wireless standard such as time to reply to the network with an acknowledgement of whether a data packet was received without error.

Note that if the processor cores in FIGS. 3 and 4 are all clocked at the same or a similarly high clock frequency, the processor cores that are lightly loaded are generally wasting power. Higher clock rates require a proportionately higher voltage source to power the chip or processor core. This is due to the higher clock rates creating higher (capacitive coupled) leakage currents which consume more power. The net result is that, in practice, a doubling of the clock frequency causes a fourfold increase in power consumption, as described by J. Svennebring, J. Logan, J. Engblom and P. Strömblad in *Embedded Multicore: An Introduction, Freescale*, July 2009.

Under the restriction that the processor loads are known and static, one method of load balancing is to provide separate clocks and voltage sources for the different processor cores so that the lightly loaded processors are clocked at slower rate and lower voltage. For example, A. T. Tran, D. N. Truong, and B. M. Baas, in *A GALS Many-Core Heterogeneous DSP Platform with Source-Synchronous On-Chip Interconnection Network*, UC Davis, 2009, describe minimizing the power consumption by clocking each processor core at a lower rate that is inversely proportional to the processor core's loading (as measured at the full clock rate) and selecting a lower applied voltage to the processor core based on the lower clock rate.

Some embodiments of the present invention are designed with the recognition that in practice, DPPs and CPPs both have requirements to support dynamic task or application execution, but have different context switching requirements. Data plane processing tasks are typically relatively stationary, being activated by main system mode changes such that a data processing application remains active for the duration of the mode, which may be from seconds to minutes or hours. Control plane applications, on the other hand, are typically highly dynamic and tend to proceed through a large number different processing states with time scales of milliseconds to seconds.

Furthermore, data plane processing typically involves large front-to-back data flows, computations that are not dependent on the data, and few code branching operations, whereas control plane processing typically involves multiple smaller data flows, computations that are data dependent and frequent code branching operations. These distinctions are discussed by Geoffrey Blake, Ronald G. Dreslinski, and Trevor Mudge, "*A Survey of Multicore Processors*", IEEE Signal Processing Magazine, November 2009. The current generation of Texas Instruments (TI) OMAP processor products is an example of a dual processor SoC that contains a TI C674x DSP core as a DPP and an ARM9 RISC core as a CPP.

Figure 5:
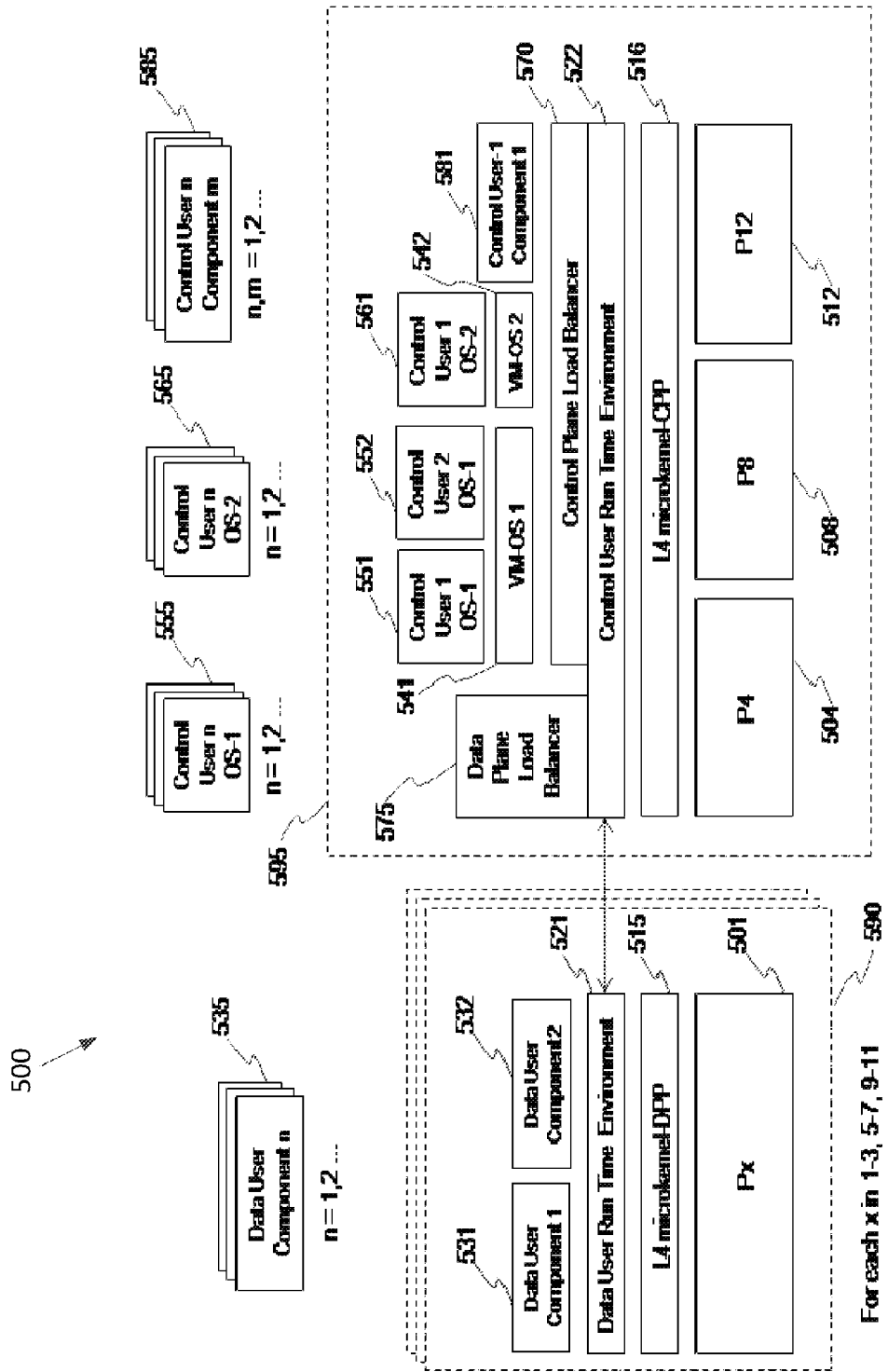
FIG. 5 illustrates a virtualization architecture, according to an embodiment of the present invention.

FIG. 5 illustrates a virtualization architecture 500, according to an embodiment of the present invention. Virtualization architecture 500 supports load balancing for both user plane and data plane processing to provide efficient load balancing in a heterogeneous multicore SoC. The DPPs and the CPPs, along with their associated runtime software layers, are shown in dashed boxes 590 and 595, respectively. In this example, the nine DPP cores represented by Px 501 and the three CPP cores 504, 508, and 512 may be included within DPPs 310 and CPPs 320, respectively, of FIG. 3. A problem addressed by this embodiment is that the existence of unique extended instructions on the various DPP cores prevents the migration between DPP cores of the Data User Components 531, 532, and 535 that use these extended instructions. The ability to migrate tasks is generally required in order to perform load balancing operations.

With the exception of the Data Plane Load Balancer 575, the virtualization architecture for the CPP cores in dashed box 595 may be equivalent to that developed by the European Union project Embedded Multi-core Processing for Mobile Communications (eMuCo), which was completed in 2010. Some embodiments of the present invention contribute the addition of Data Plane Load Balancer 575 in conjunction with the separate virtualization of individual DPP cores as indicated in dashed box 590.

In practice, it may be desirable to have an architecture that provides load balancing to an embedded SoC that contains a heterogeneous mix of processors with the primary grouping as either DPPs (DPP cores) or CPPs (CPP cores) as in FIG. 5. The DPP cores are more numerous than the CPP cores in many embodiments. The CPP cores may have an equivalent supported instruction set (e.g., all ARM processors), and may be well-served by the eMuCo architecture. However, the specialized DPP cores are generally not. In some embodiments of the present invention, all or subsets of the DPP cores are based on a common base DPP instruction set with extensions to support the DPP cores that have specialized processing elements.

The specialized processing elements of the DPP cores of some embodiments of the present invention can be thought of as tightly coupled accelerator logic that is accessed by means of extended instructions of the DPP core. These custom extended instructions may be automatically invoked by the DPP's compiler. This is in contrast to peripherally coupled accelerator logic 150 of FIG. 1, which problematically requires the compiled DPP code to be linked to a custom assembly code driver in order for the DPP code to access the accelerator.

As described by G. Heiser in *The Role of Virtualization in Embedded Systems*, NICTA 2008, the virtualization in 595 can be advantageously used to support and isolate: (1) multiple virtual machine based operating systems 541 and 542 and their applications 551, 552, 555 and 561, 565, respectively; and (2) software components 581 and 585 that directly call the services in the run time environment layer 522. Both Control Plane Load Balancer 570 and new Data Plane Load Balancer 575 may be technically in the run time environment layer 522, but are separately identified in FIG. 5 since they are of particular interest.

Some embodiments of the present invention relate to methods and systems for task migration support in Data User Run Time Environment 521 in a virtualized heterogeneous multicore system where the instruction set of the cores is related, but not identical. Tasks may be migrated between heterogeneous processor cores that, by construction, are: (1) related by a common base instruction set; and (2) distinguished by extended instructions that control closely attached and application-specialized accelerator logic. This task migration support allows load balancing operations that can result in improved core utilization and reduced system power consumption.

In the eMuCo architecture, the Control Plane Load Balancer 570 can intercept thread creations to gain control of the threads in the applications, migrate threads between available cores, and turn off cores to reduce power consumption. As described by D. Tudor, G. Macariu, C. Jebelean and V. Cretu in *Towards a Load Balancer Architecture for Multi-Core Mobile Communication Systems*, International Symposium on Applied Computational Intelligence and Informatics, May 2009, "the main goal of the load balancer component is to ensure that, at each given moment, work is evenly distributed between the available CPUs. This implies that running threads should be migrated between CPUs such that no CPU becomes overloaded while other CPUs are kept under little stress, unless they are totally switched off."

The eMuCo architecture and the particular definition of a Control Plane Load Balancer 570 by Tudor et al. provides a method of using virtualization to support load balancing for homogeneous multicore SoCs. The approach is to perform thread migration between equivalent cores using run time application priorities that depend on high level system states and resource requirements in the form of a scheduling contract based on offline application profiling.

The L4 microkernel may be an important minimal computer operating system kernel as summarized, for example, by H. Hartig, M Roitzsch, A. Lackorzynski, B. Dobel and A. Bottcher in *L4—Virtualization and Beyond*, TECOM 2008. L4 kernels 515 and 516 provide low overhead address space management, thread handling, and interprocess communication (IPC) and support the creation of services in run time environment layers 521 and 522 that are customized for the user applications of interest. Examples of services in the run time environment layer include low-to-high level driver code and virtualized resource allocation and management. The L4 microkernel-CPP 516 supports the homogeneous multicore CPPs (i.e., CPP cores 504, 508, and 512) that may be ARM RISC or Intel x86 cores, for example.

In some embodiments of the present invention, the L4 microkernel-DPP layers 515 each support individual DPPs (e.g., DPP core 501) that have specialized extensions to an otherwise common ISA. Since arithmetic computation is fundamentally addition, multiplication, and division, there should generally be a large degree of overlap in the ability of different DPP cores of this type to support the various data user software components, although the computational efficiencies may vary as a result of different specialized processing elements on the different DPP cores. Some embodiments of the present invention pertain to a method for the different DPP cores to support the same data user software components.

In accordance with the present invention, if a given DPP core does not support an extended instruction set that was developed for use with a different specialized DPP core on the same SoC, the Data User Run Time Environment 521 of the given core may provide a service that traps the extended instruction(s) and instead uses instructions that are supported and computationally equivalent, but may be slower.

In this manner, some embodiments of the present invention recognize the value of using sets of DPPs that have specialized extensions to an otherwise common ISA. In particular, this type of DPP: (1) does away with special ASIC accelerator hardware that, although integrated on the SoC, is peripherally attached to DPP cores (e.g., the accelerators become processing elements of the core supported by ISA extensions); and (2) allows the embodiment's load balancing of data plane tasks across DPPs with a common base ISA.

Provided the common base instruction set of the DPPs supports arithmetic, the Data User Run Time Environment for the "inferior" DPP (e.g., one with only the common base ISA) contains services that intercept the extended instruction of a "superior" DPP (e.g., one with the specialized processing elements for an audio codec) and Data User Run Time Environment does the same computation with the base ISA arithmetic and perhaps additional memory resources (but perhaps at a slower rate). In general, specialized processing elements or hardware accelerators have a software equivalent that can be implemented with the arithmetic of such a common base instruction set. This software equivalent implementation defines the software service in Data User Run Time Environment 521 of the "inferior" DPP core that traps the extended instruction(s) of the "superior" DPP core and uses instructions that are supported in the base ISA of the "inferior" DPP core to perform the data plane task in a functionally equivalent, but perhaps slower, manner. Such software services of Data User Run Time Environment 521 allow the migration of data plane tasks between such DPPs. It may be preferable that the arithmetic precision of the base ISA be equivalent or better than the arithmetic precision of the specialized processing elements of any DPP.

In one embodiment of Data Plane Load Balancer 575, each Data User Component 531, 532, and 535 is profiled offline to generate an associated Resource Requirements Table. For example, FIG. 6 illustrates a Resource Requirements Table 600 for Data User Component n that identifies Memory Requirements and a Normalized Execution Time for executing the component on each of the DPP cores, according to an embodiment of the present invention. In this example, the Data User Component (e.g., Wireless Baseband-1 Data-3 of FIG. 3) executes the fastest on DPP core P3 203 and for some reason cannot be executed on DPP cores P10 210 or P11 211. A possible reason is that DPP cores P10 210 and P11 211 do not share a common base instruction set with the other DPP cores. It can be assumed here that DPP cores P10 210 and P11 211 have a common base ISA that is different from the common base ISA of the other DPP cores, which are P1 201, P2 202, P3 203, P5 205, P6 206, P7 207, and P9 209.

Resource Requirements Table 600 can be used in an additional offline analysis to establish power efficient mappings or allocations of the Data User Components to the DPP cores for different data plane and/or system modes. The modes are typically determined by a main level component of the embedded system in some embodiments. One example form of the offline analysis is a simple trial and error approach to minimize the SoC power consumption, but more sophisticated optimization approaches such as "simulated annealing" may be used. The results of the offline component allocation analysis may be stored in Mode ID DPP Component Profile tables, such as Mode ID DPP Component Profile table 700 of FIG. 7. For each system mode, such tables may provide a mapping of the required Data User Components to DPP cores.

Figure 8:
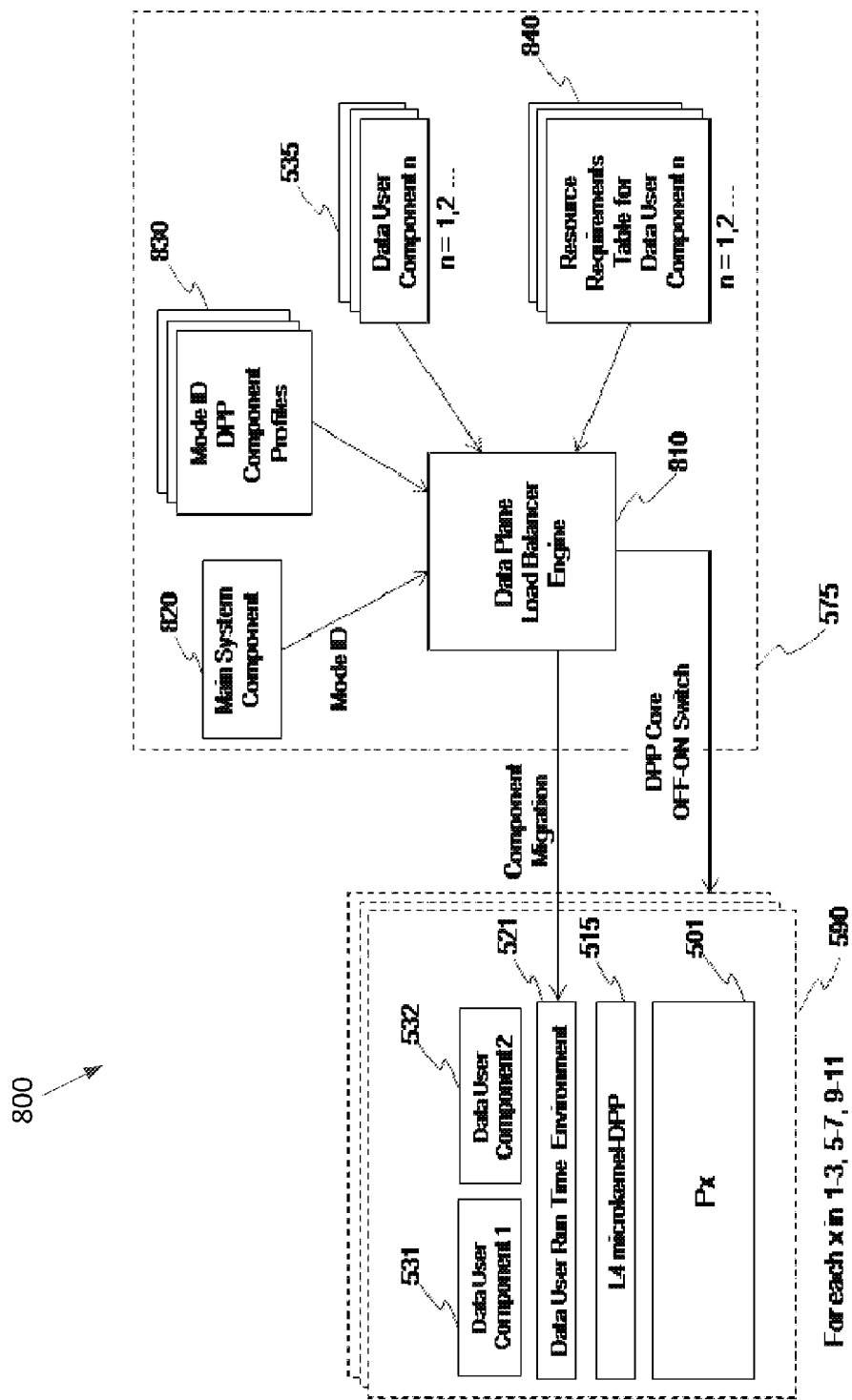
FIG. 8 illustrates an architecture with the Data Plane Load Balancer, according to an embodiment of the present invention.

FIG. 8 illustrates an architecture 800 with Data Plane Load Balancer 575, according to an embodiment of the present invention. Data Plane Load Balancer (DPLB) Engine 810 is a service of the Control User Run Time Environment 522 of FIG. 5 in this embodiment. DPLB Engine 810 inputs a Mode ID from a Main System Component 820 and based on the Mode ID inputs of the associated DPP Component Profile table, such as table 700 of FIG. 7. As necessary, Component Migration commands are delivered to Data User Run Time Environment 521, which contains service components that can provide creation, termination, and/or migration of the Data User Components. As part of the Component Migration command, DPLB Engine 810 inputs or points to required Data User Components 535 and inputs or points to the Resource Requirements Table (such as table 600 of FIG. 6) for Data User Components 840. As necessary to either save power or increase processing capacity, DPLB Engine 810 delivers DPP Core OFF-ON Switch commands.

The above proposed system mode switched implementation of Data Plane Load Balancer 575 may be consistent with the discussion of Tudor et al. Other run time load balancing approaches may be used and still be consistent with the virtualization supported load balancing architecture illustrated in FIG. 5.

Some embodiments of the present invention pertain to a virtualization architecture that supports Data Plane Load Balancer 575 that moves Data User Components (data plane tasks or programs) between heterogeneous DPPs having a common base ISA so as to turn off DPPs where possible to save power. Thread balancing is generally not the main concern for the Data Plane Load Balancer, and standard single core virtualization thread management techniques may be assumed for the components loaded on a DPP. The single core thread management of a DPP may provide that the components loaded on the DPP all finish in the (system) cycle time of the embedded system. In contrast, multicore thread optimization is a goal of Control Plane Load Balancer 570 when the implementation is consistent with the eMuCo project and the discussion of Tudor et al., which references eMuCo as a forerunner.

Figure 9:
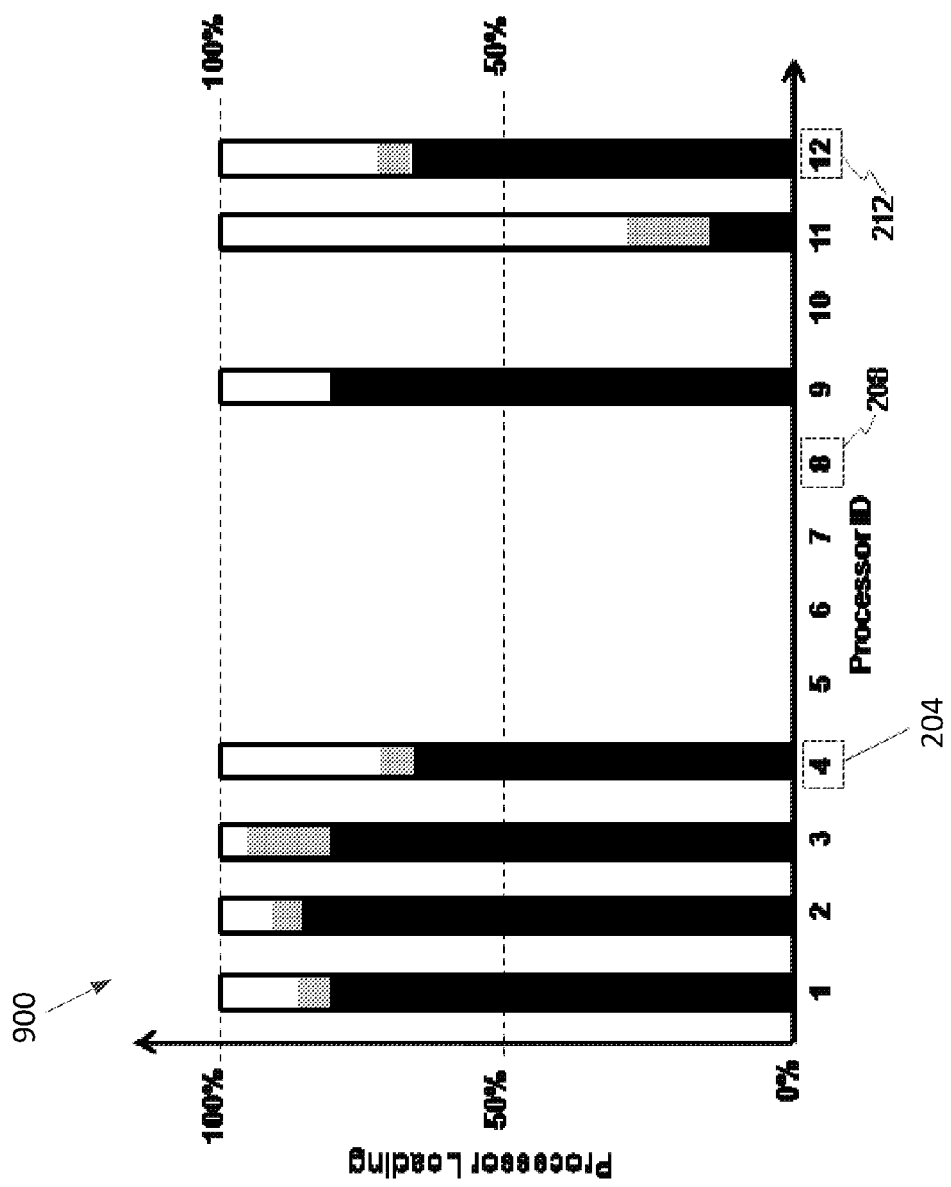
FIG. 9 illustrates a bar graph of a Processor Load distribution, according to an embodiment of the present invention.

FIG. 9 illustrates a bar graph 900 of a Processor Load distribution for the same system mode as in FIG. 4, but after the power saving load balancing actions of Data Plane Load Balancer 575 and Control Plane Load Balancer 570. Data Plane Load Balancer 575 has commanded the migration of the Data User Components off of DPP cores P5 205, P6 206, P7 207, and P10 210, and on to DPP cores P1 201, P2 202, P3 203, and P11 211, respectively, and has turned the former DPP cores OFF to save power. Control Plane Load Balancer 570 has turned off CPP core P8 208 and is distributing the active control plane threads between CPP cores P4 204 and P12 212. The net result is that it is possible to shut down 5 of the 12 cores without any loss of performance while providing a system power savings that is on the order of 42% (i.e., $5/12$).

Mapping Extended Instructions to Equivalent Instructions

Figure 10:
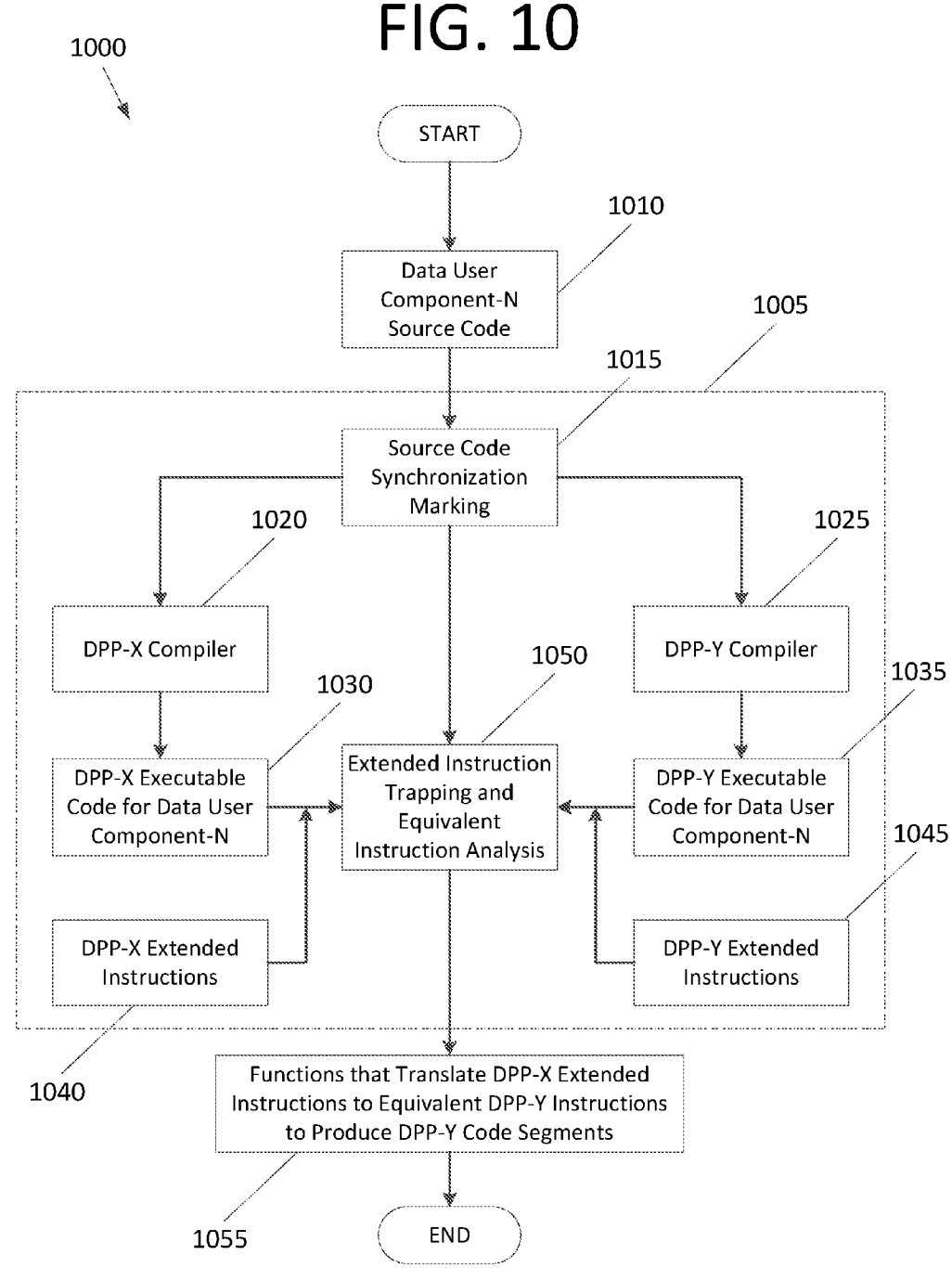
FIG. 10 illustrates a flowchart of a method of mapping extended instructions to equivalent instructions, according to an embodiment of the present invention.

FIG. 10 illustrates a flowchart 1000 of a method of mapping extended instructions to equivalent instructions, according to an embodiment of the present invention. The operations of flowchart 1000 are performed by an Extended Instructions to Equivalent Instructions (EI2EI) Analysis Engine 1005. In this embodiment, Data User Component—N Source Code 1010 is the source code for one of several components that executes in the data plane of the SoC. Note that if Data User Component—N Source Code 1010 is employed as the, or one of the, application source codes for optimizing the design of the DPP-X core using a DPP Processor Generator, then the DPP-X core is expected to provide the highest performance, or one of the highest performances, for the Data User Component—N when compared to other DPP cores.

EI2EI Analysis Engine 1005 analyzes custom DPP compiled machine level instructions to obtain equivalent instructions between two cores—DPP-X and DPP-Y—which may both have been synthesized with a DPP Processor Generator, and which may have different sets of extended instructions. Note that one possible set of extended instructions is the null set since DPP cores can be synthesized without extended instructions. The output of EI2EI Analysis Engine 1005 may be a set of "DPP-Y code segments" (e.g., a set of function calls) that can be executed on the DPP-Y core to produce computational results that are equivalent to those of specific source-code associated "DPP-X code segments" when they are executed on the DPP-X core. The "DPP-X code segments" of interest may include DPP-X extended instructions that are not available to the DPP-Y core. The outputs of EI2EI Analysis Engine 1005 translate DPP-X extended instructions to equivalent instructions (EI2EI) for DPP-Y 1055.

A Source Code Synchronization Marking module 1015 examines the source code for functional entry points based on the structure of the source code and inserts synchronization markers into a copy of the source code as well as into the associated DPP-X and DPP-Y Executable Code, 1030 and 1035, output from the DPP-X Compiler 1020 and the DPP-Y Compiler 1025, respectively. The Extended Instruction Trapping and Equivalent Instruction Analysis module 1050 inputs the DPP-X and DPP-Y executable code with the synchronization markers, 1030 and 1035, respectively, and also inputs the lists of DPP-X and DPP-Y extended instructions 1040 and 1045, respectively.

Figure 11:
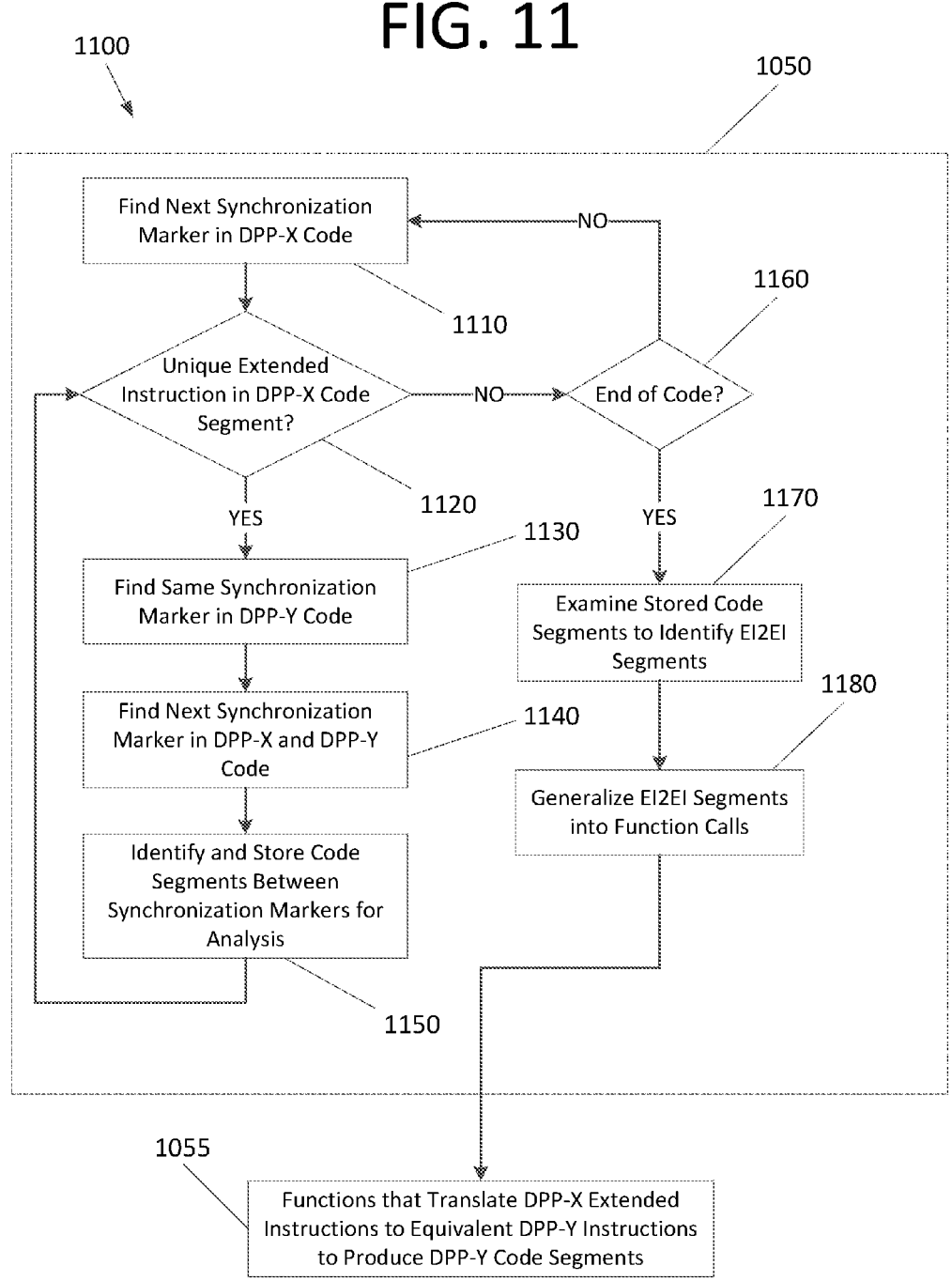
FIG. 11 is a flowchart illustrating the Extended Instruction Trapping and Equivalent Instruction Analysis component of FIG. 10, according to an embodiment of the present invention.

FIG. 11 is a flowchart 1100 illustrating Extended Instruction Trapping and Equivalent Instruction Analysis component 1050 of FIG. 10, according to an embodiment of the present invention. The synchronization markers in the DPP-X code are used to bound segments of interest for the localization of DPP-X extended instructions. The next DPP-X synchronization marker is found at 1110 and the code segment is searched for DPP-X extended instructions at 1120 which are unique to DPP-X. If such instructions are found, the same synchronization markers are found in the DPP-Y code at 1130 and 1140, and the relevant DPP-X and DPP-Y code segments are identified and stored at 1150 for analysis.

This source-code associated code segment identification process continues until the end of the DPP-X compiled code is reached at 1160. The accumulated code segments are then examined to identify the precise EI2EI segments of interest at 1170. This can be done, for example, with a parsing of the DPP-X and DPP-Y code segments that identifies regions of code following the DPP-X extended instruction that are totally equivalent until the ending synchronization marker. The accumulated EI2EI segments of interest are then generalized into code functions at 1180 that can be executed on the DPP-Y core. This "generalization" may be, for example, local code generation that: (1) creates arguments to be set/passed; and (2) creates a function call of DPP-Y code containing these arguments that is composed of or equivalent to the DPP-Y code portion of the EI2EI segments identified at 1170. The output of Extended Instruction Trapping and Equivalent Instruction Analysis 1050 and, hence, EI2EI Analysis Engine 1005, is a set of functions 1055 that translate code containing "DPP-X unique" extended instructions to equivalent instructions for the DPP-Y core.

Figure 12:
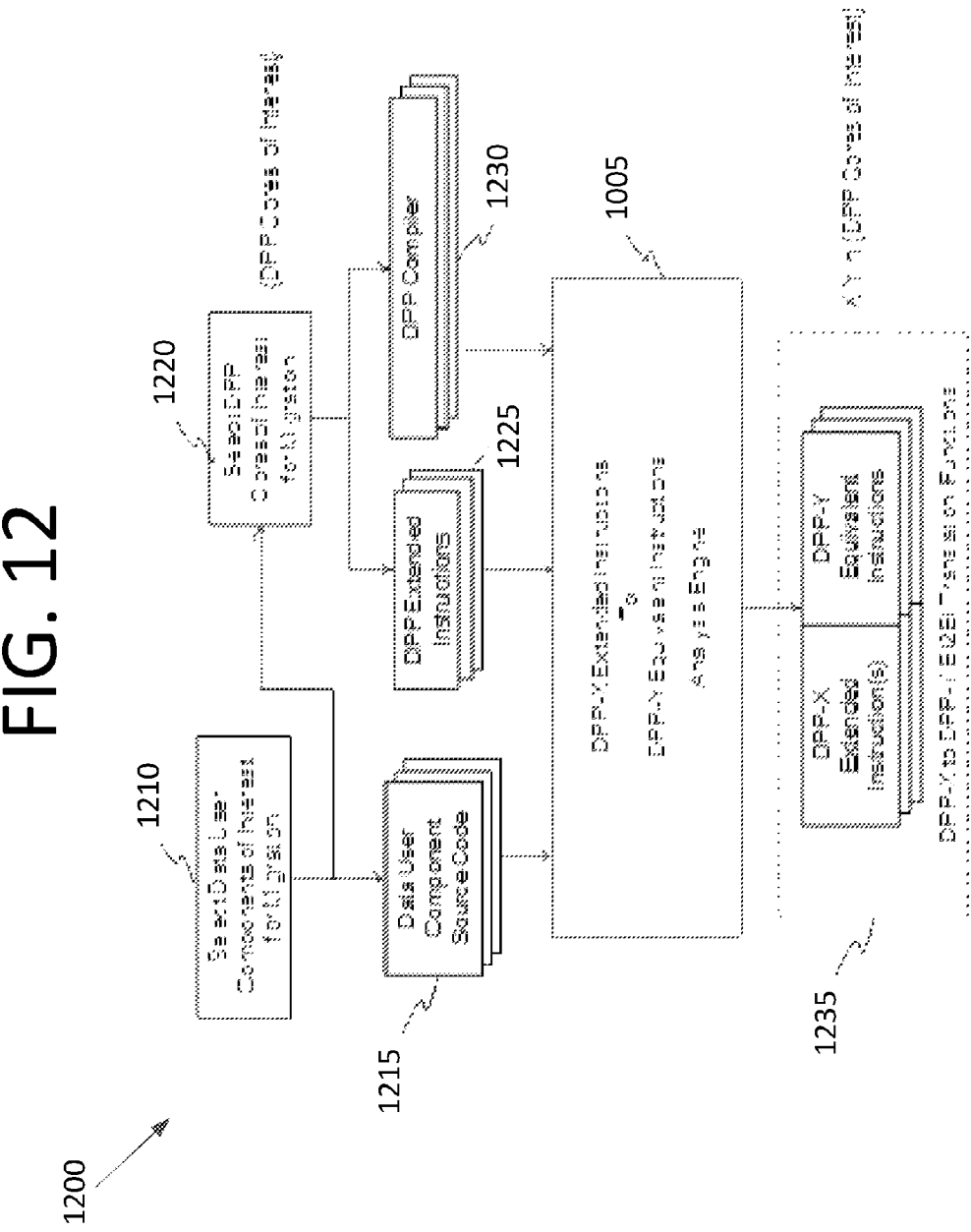
FIG. 12 is a flowchart illustrating an automated design flow process, according to an embodiment of the present invention.

FIG. 12 is a flowchart 1200 illustrating an automated design flow process, according to an embodiment of the present invention. The automated design flow process uses EI2EI Analysis Engine 1005 to generate a set of DPP-X to DPP-Y EI2EI Translation Functions at 1235 that are required for task migration support in an embedded SoC. Here, the design engineer selects the data user software components that are of interest for task migration at 1210 and provides a set of data user software source code components at 1215 as input to EI2EI Analysis Engine 1005. The design engineer also selects the specific DPP cores that are of interest for the task migration at 1220, and provides a set of DPP specific extended instructions at 1225 and a set of DPP specific compilers at 1230.

EI2EI Analysis Engine 1005 may be cycled for all combinations of selected source code and DPP inputs, letting each DPP be represented twice, once as the DPP-X or "migration from" processor core and once as the DPP-Y or "migration to" processor core. For each DPP-X or DPP-Y combination, the accumulation of code segments (1110 to 1160 in FIG. 11) prior to analysis (1170 and 1180 in FIG. 11) is performed for the entire group of data user software components at 1210 that have been selected for task migration. The outputs of the example automated process in FIG. 12 is the set of DPP-X to DPP-Y EI2EI Translation Functions at 1235 that support task migration of any of the Data User Component/Tasks at 1215 from a given DPP-X core to DPP-Y core, where X and Y refer to different members of the selected set of DPP cores at 1220.

Run Time Task Migration and EI2EI Translation

FIG. 13 is a bar graph 1300 illustrating an EI2EI Translation Function Identification Table, according to an embodiment of the present invention. This table indicates which translation functions are required by the different DPP (DPP-Y) cores on the embedded SoC so they can support task migration from another DPP (DPP-X) core. In this example, DPP cores 1 and 4 appear to be identical based on the migration support requirements. The same is true of DPP cores 2 and 6 and also DPP cores 3 and 5. DPP cores 2 and 6 do not require any EI2EI translation functions, which suggests they may have been designed such that their set of extended instructions includes all of the extended instructions (if any) of the other DPP cores (1 and 3-5). DPP cores 1 and 4 may require the most EI2EI translation support for task migration. DPP cores 3 and 5 may require an intermediate level of support, and DPP cores 2 and 6 may require no support. For example, a data user task migrating from the DPP-6 core to the DPP-3 core may contain DPP-6 unique extended instructions that invoke the EI2EI Translation Function 6-3 during run time.

Figure 14:
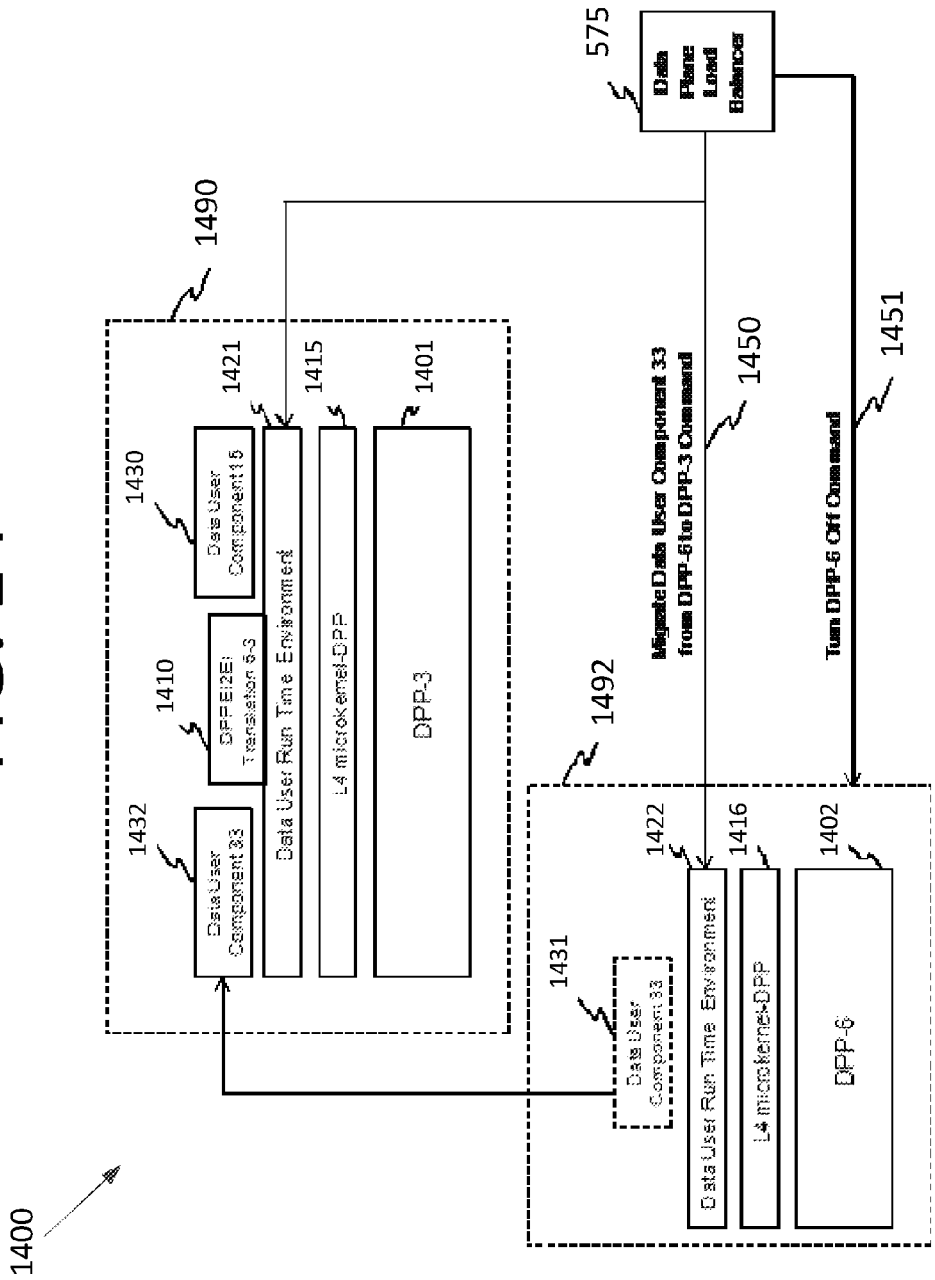
FIG. 14 is a flowchart illustrating a task migration, according to an embodiment of the present invention.

FIG. 14 is a flowchart 1400 illustrating a task migration, according to an embodiment of the present invention. The task migration depicted here is between two DPP cores in an embedded SoC that has the data plane and control plane multicore virtualization architecture illustrated in FIG. 5. Regarding the control plane virtualization architecture in dashed box 595 of FIG. 5, only Data Plane Load Balancer 575 is shown in FIG. 14. Regarding the data plane virtualization architecture in dashed box 590 of FIG. 5, only software layers and processor for DPP-3 1490 and DPP-6 1492 are shown in FIG. 14. In this example, DPP-3 1490 and DPP-6 1492 are each initially running only one data user software component/task, Data User Component 15 1430 and Data User Component 33 1431, respectively.

Furthermore, here, Data Plane Load Balancer 575 issues a command: "Migrate Data User Component 33 from DPP-6 to DPP-3" 1450 to the Data User Run Time Environments 1422 and 1421 on the respective DPP-6 1492 and DPP-3 1490 cores. After Data User Component 33 1432 has been successfully migrated from DPP-6 1492 to DPP-3 1490, Data Plane Load Balancer 575 issues a "Turn DPP-6 Off" Command 1451 in order to save power.

Task migration mechanisms for homogeneous processor cores are known, for example as described by Andrea Acquaviva, Andre Alimonda, Salvatore Carta and Michele Pittau in the article *Assessing Task Migration Impact on Embedded Soft Real-Time Streaming Multimedia Applications*, EURASIP Journal on Embedded Systems, Vol. 2008. Such mechanisms may be part of Data User Run Time Environments 1422 and 1421 and may provide the mechanics of moving Data User Component 33 1431 from DPP-6 1492 to DPP-3 1490.

In some embodiments, DPP EI2EI Translation Function 6-3 1410 also resides as a service of Data User Run Time Environment 1421 of DPP-6 1492 to support the migration of tasks from DPP-6 1492 to DPP-3 1490. DPP EI2EI Translation Function 6-3 1410 allows Data User Component 33 1431 to have extended instructions that, by construction of DPP-6 1492, are designed to execute on DPP-6 1492 but not on DPP-3 1490. DPP EI2EI Translation Function 6-3 1410 allows Data User Run Time Environment 1421 to trap DPP-6 1492 unique extended instructions and insert computationally equivalent instructions that can execute on DPP-3 1490. This task migration support allows load balancing operations which may result in improved core utilization and reduced system power consumption.

Some embodiments of the present invention pertain to a virtualization architecture and extensions to support load balancing in heterogeneous multicore SoCs for embedded applications where both DPPs and CPPs are present. SoCs for embedded applications are employed where a single chip contains groups of DPP cores and groups of CPP cores. In some aspects, the virtualization architecture may be used to support load balancing of DPP cores that are physically homogeneous, but specialized by means of extensions to an otherwise common ISA. In certain aspects, it may be assumed that the DPP cores are automatically synthesized using currently available high level design tools. The approach to load balancing of some embodiments may provide improvements in core utilization and reductions in system power consumption.

The method steps performed in FIGS. 10-12 may be performed by a computer program, encoding instructions for the nonlinear adaptive processor to perform at least the methods described in FIGS. 10-12, in accordance with an embodiment of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 10-12, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Although exemplary embodiments of the present invention have been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of SoC 200 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Further, the messages sent or received by any of the modules may be sent or received directly and/or via one or more of the other modules.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A computer-implemented method performed by a physical computing device, the computer-implemented method comprising:
    migrating a task from a first data plane processing core to a second data plane processing core, wherein the first data plane processing core and the second data plane processing core share a base instruction set from a commonly shared instruction set architecture (ISA), and the first data plane processing core is configured to process the task using a first set of extended instructions of the commonly shared ISA which is not supported by the second data plane processing core;
    wherein the task is migrated from the first data plane processing core to perform load balancing between the first and second data plane processing cores;
    determining computationally equivalent instructions, to be used by the second data plane processing core to process the migrated task, from a second set of extended instructions of the commonly shared ISA which are supported by the second data plane processing core and which are not supported by the first data plane processing core; and
    processing the migrated task by the second data plane processing core based on the determined computationally equivalent instructions from the second set of extended instructions of the commonly shared ISA which are not supported by the first data plane processing core;
    wherein extended instructions for processing the task which are supported by the first data plane processing core are trapped;
    wherein the extended instructions corresponding to the trapped instructions for processing the task which are supported by the second data plane processing core are determined.

2. The computer-implemented method of claim 1, further comprising:
    examining source code for functional entry points based on a structure of the source code; and
    inserting synchronization markers into a copy of the examined source code and into associated executable code for the first and second data plane processing cores output from compilers of the first and second data plane processing cores.

3. The computer-implemented method of claim 1, wherein the first and second data plane processing cores are configured by different sets of extended instructions to the commonly shared ISA.

4. The computer-implemented method of claim 1, wherein the task is migrated from the first data plane processing core to perform load balancing between the first and second data plane processing cores occurs even though the first and second data plane processing cores support different sets of extended instructions to the common ISA, respectively.

5. The computer-implemented method of claim 1, further comprising outputting an indication of the determined extended instructions to the second data plane processing core for executing the code segments.

6. A computer-implemented method performed by a physical computing device, the computer-implemented method comprising:
   searching code for a synchronization marker; and
   when a synchronization marker is found, determining whether a corresponding code segment contains extended instructions of a commonly shared instruction set architecture (ISA), and if so, identifying and storing code segments for processing a task by a first data plane processing core and other code segments for processing the task by a second data plane processing core,
   wherein the first data plane processing core and the second data plane processing core share a base instruction set from the commonly shared ISA, and the first data plane processing core supports is configured to process the task using a first set of extended instructions of the commonly shared ISA that which is not supported by and which is different than a second set of extended instructions of the commonly shared ISA supported by the second data plane processing core, and
   when executed by the first data plane processing core based on the first set of extended instructions to the common ISA, the executed code segments are configured to process the task and produce computational results that are equivalent to the other code segments being executed for processing the task by the second data plane processing core based on the second and different set of extended instructions to the common ISA;
   wherein code segments are examined to identify Extended Instructions to Equivalent Instructions (EI2EI) segments of interest;
   wherein the EI2EI segments of interest are generalized into code functions that can be executed on the second data plane processing core.

7. The computer-implemented method of claim 6, wherein the searching of the code further comprises searching until an end of the code is reached.

8. The computer-implemented method of claim 6, wherein the synchronization marker is used to bound code segments of interest for localization of extended instructions for the first data plane processing core.

9. The computer-implemented method of claim 6, wherein the identifying of EI2EI segments of interest comprises parsing code segments of the first data plane processing core and the second data plane processing core to identify regions of code following a given extended instruction of the first data plane processing core that are equivalent until an ending synchronization marker.

10. The computer-implemented method of claim 6, wherein the generalizing comprises local code generation that creates arguments to be set and passed and creates a function call of code of the second data plane processing core containing the arguments that is composed of or equivalent to the second data plane processor code portion of the identified EI2EI segments.

* * * * *